United States Patent
Tsuchida

(10) Patent No.: US 12,160,506 B2
(45) Date of Patent: Dec. 3, 2024

(54) SHUFFLING SHARES AMONG NODES TO DETECT INCORRECTNESS OR FRAUDS

(71) Applicant: NEC Corporation, Tokyo (JP)

(72) Inventor: Hikaru Tsuchida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 262 days.

(21) Appl. No.: 17/779,352

(22) PCT Filed: Nov. 28, 2019

(86) PCT No.: PCT/JP2019/046572
§ 371 (c)(1),
(2) Date: May 24, 2022

(87) PCT Pub. No.: WO2021/106143
PCT Pub. Date: Jun. 3, 2021

(65) Prior Publication Data
US 2022/0399991 A1    Dec. 15, 2022

(51) Int. Cl.
*H04L 9/08*    (2006.01)
(52) U.S. Cl.
CPC .................................. *H04L 9/085* (2013.01)
(58) Field of Classification Search
CPC ....................................................... H04L 9/085
USPC ........................................................ 713/153
See application file for complete search history.

(56) References Cited

U.S. PATENT DOCUMENTS

| 10,867,018 | B2 * | 12/2020 | Ikarashi .................. H04L 9/085 |
| 2010/0002695 | A1 * | 1/2010 | Cheung ................ H04L 65/611 370/390 |
| 2011/0135088 | A1 * | 6/2011 | Rudland ............... H04L 9/0841 380/46 |
| 2012/0036187 | A1 * | 2/2012 | Luboshitz ............. H04L 67/104 709/204 |
| 2013/0013931 | A1 * | 1/2013 | O'Hare ................. H04L 9/3231 713/189 |
| 2013/0182836 | A1 * | 7/2013 | Hamada ................ H04L 9/0891 380/28 |
| 2016/0335924 | A1 * | 11/2016 | Ikarashi .................... G09C 1/00 |

(Continued)

FOREIGN PATENT DOCUMENTS

| JP | 2009-122731 A | 6/2009 |
| JP | 2010-039890 A | 2/2010 |

(Continued)

OTHER PUBLICATIONS

International Search Report for PCT Application No. PCT/JP2019/046572, mailed on Feb. 10, 2020.

(Continued)

*Primary Examiner* — David P Zarka

(57) ABSTRACT

Among four secure computation nodes holding first to third shares of data in a secret-shared form, first and second secure computation nodes are selected as resharing nodes, and third and fourth secure computation nodes are selected as receiving nodes. The first and second secure computation nodes perform a mini-shuffle for resharing the shares they each hold by using a permutation that third and fourth receiving nodes do not know. Next, the third and fourth secure computation nodes perform a mini-shuffle for resharing the shares they each hold by using a permutation that first and second receiving nodes do not know.

8 Claims, 9 Drawing Sheets

(56) References Cited

U.S. PATENT DOCUMENTS

| | | | | |
|---|---|---|---|---|
| 2017/0353311 | A1* | 12/2017 | Schukai | H04L 9/3231 |
| 2018/0205707 | A1* | 7/2018 | Bellala | H04L 9/085 |
| 2018/0234233 | A1* | 8/2018 | Knezevic | H04L 9/0894 |
| 2020/0059351 | A1* | 2/2020 | Atallah | H04L 9/008 |
| 2022/0060319 | A1* | 2/2022 | Patel | H04L 9/085 |
| 2022/0343027 | A1* | 10/2022 | Araki | G06F 21/6218 |
| 2022/0368723 | A1* | 11/2022 | Tsuchida | G09C 1/00 |
| 2022/0399991 | A1* | 12/2022 | Tsuchida | H04L 9/085 |
| 2023/0006846 | A1* | 1/2023 | Zhu | H04L 63/123 |
| 2023/0403143 | A1* | 12/2023 | Tsuchida | G06F 21/57 |
| 2024/0106654 | A1* | 3/2024 | Tsuchida | G09C 1/00 |

FOREIGN PATENT DOCUMENTS

| | | |
|---|---|---|
| JP | 2012-154990 A | 8/2012 |
| JP | 2013-200461 A | 10/2013 |
| JP | 2017-040851 A | 2/2017 |
| WO | 2012/046692 A1 | 4/2012 |
| WO | 2015/107952 A1 | 7/2015 |
| WO | 2016/129363 A1 | 8/2016 |
| WO | 2018/061391 A1 | 4/2018 |
| WO | 2019/039380 A1 | 2/2019 |
| WO | 2019/087317 A1 | 5/2019 |

OTHER PUBLICATIONS

Ikarashi et al., "A Design and an Implementation of Super-high-speed Multi-party Sorting: The Day When Multi-party Computation Reaches Scripting Languages", Computer Security Symposium 2017, Oct. 23-25, 2017, pp. 600-607.

Laur et al., "Round-efficient oblivious database manipulation", Information Security ISC 2011, Lecture Notes in Computer Science, vol. 7001, pp. 1-16.

* cited by examiner

SHUFFLING SHARES AMONG NODES TO DETECT INCORRECTNESS OR FRAUDS

This application is a National Stage Entry of PCT/JP2019/046572 filed on Nov. 28, 2019, the contents of all of which are incorporated herein by reference, in their entirety.

FIELD

The present invention relates to a shuffle system, a shuffle method, and a program.

BACKGROUND

Patent Literature (PTL) 1 discloses a secure computation method that achieves secure computation including secret random permutations at high-speed. In addition, as an application of such secure computation, there is database processing in which data and queries are kept secret. In addition, a sorting protocol is used as an important sub-protocol to realize database operations on the secure computation. PTL2 discloses a sorting algorithm that is not based on comparison.

There are several methods for realizing the above sorting protocol. Two typical schemes are as follows.

A scheme based on a sorting network
A scheme using shuffling (random permutations)

The scheme using shuffling needs less cost, and PTLs 1 and 2 both adopt this scheme. Two typical examples of the scheme using shuffling (random permutations) are as follows.

A semi-honest security scheme using three-party (ring) replicated secret sharing (see Non Patent Literature (NPL) 1)
A semi-honest security/malicious security scheme using N-party (field) additive secret sharing (see NPL2)
PTL1: International Publication No. 2015/107952
PTL2: Japanese Unexamined Patent Application No. 2012-154990
NPL1: IKARASHI Dai, et al., "A Design and an Implementation of Super-high-speed Multi-party Sorting: The Day When Multi-party Computation Reaches Scripting Languages", Computer Security Symposium 2017, proceedings 2017.2 (2017)
NPL2: Sven Laur, Jan Willemson, and Bingsheng Zhang, "Round-efficient oblivious database manipulation", International Conference on Information Security, Springer, Berlin, Heidelberg, 2011, [searched on Nov. 1, 2019], Internet <URL: https://eprint.iacr.org/2011/429.pdf>

SUMMARY

The following analysis has been made by the present inventor. In accordance with the scheme in NPL1, since three-party secret sharing is performed, only two permutations are needed per round. However, if four-party secret sharing is performed, the number of permutations is increased, which is a problem. For example, NPL2 discloses that, when N-party secret sharing is performed, the number of permutations based on the number of parties is needed (see "4.1 Oblivious Shuffle based on Permutation Matrices" in NPL2).

It is an object of the present invention to provide a shuffle system, a shuffle method, and a program that can reduce the number of permutations in four-party shuffling, thereby contributing to reduce the computation cost.

According to a first aspect, there is provided a shuffle system, that is configured to select, among four secure computation nodes holding first to third shares of data in a secret-shared form, first and second secure computation nodes as resharing nodes and third and fourth secure computation nodes as receiving nodes; and shuffle the shares. Concretely, the first and second secure computation nodes perform a mini-shuffle for resharing the shares they each hold by using a permutation that the third and fourth receiving nodes do not know. Then, the first secure computation node transmits a first share to the third secure computation node, the first secure computation node transmits a difference between the first share and a second share to the fourth secure computation node, the second secure computation node transmits a third share to the third secure computation node, and the second secure computation node transmits a difference between the second share and the third share to the fourth secure computation node, as a first round. Next, the third and fourth secure computation nodes perform a mini-shuffle for resharing the share(s) they each hold by using a permutation that the first and second receiving nodes do not know. Then, the third secure computation node transmits a first share to the first secure computation node, the fourth secure computation node transmits a difference between the first share and a second share to the first secure computation node, the third secure computation node transmits a third share to the second secure computation node, and the fourth secure computation node transmits a difference between the second share and the third share to the second secure computation node, as a second round.

According to a second aspect, there is provided a shuffle method wherein shuffling shares is performed in a configuration that, among four secure computation nodes holding first to third shares of data in a secret-shared form, first and second secure computation nodes are selected as resharing nodes and third and fourth secure computation nodes are selected as receiving nodes. Concretely, the first and second secure computation nodes perform a mini-shuffle for resharing the shares they each hold by using a permutation that the third and fourth receiving nodes do not know. Then, the first secure computation node transmits a first share to the third secure computation node, the first secure computation node transmits a difference between the first share and a second share to the fourth secure computation node, the second secure computation node transmits a third share to the third secure computation node, and the second secure computation node transmits a difference between the second share and the third share to the fourth secure computation node, as a first round. Next, the third and fourth secure computation nodes perform a mini-shuffle for resharing the shares they each hold by using a permutation that the first and second receiving nodes do not know. Then, the third secure computation node transmits a first share to the first secure computation node, the fourth secure computation node transmits a difference between the first share and a second share to the first secure computation node, the third secure computation node transmits a third share to the second secure computation node, and the fourth secure computation node transmits a difference between the second share and the third share to the second secure computation node, as a second round. The present method is associated with certain machines referred to as the secure computation nodes configured by the four secure computation nodes.

According to a third aspect, there is provided a (computer) program for realizing the functions of the above secure computation nodes. This program can be inputted to a computer apparatus via an input device or a communication interface from the outside, be stored in a storage device, cause a processor to drive in accordance with predetermined steps or processes, and display, as needed, a result of the processes including an intermediate state per stage on a display device or communicate with the outside via the communication interface. For example, the computer apparatus for this purpose typically includes a processor, a storage device, an input device, a communication interface, and a display device as needed, which can be connected to each other via a bus. In addition, this program can be a recorded in a computer-readable (non-transitory) storage medium.

According to the present invention, there are provided a shuffle system, a shuffle method, and a program that can reduce the number of permutations in four-party shuffling, thereby contributing to reduce the computation cost.

PREFERRED MODES

Figure 1:
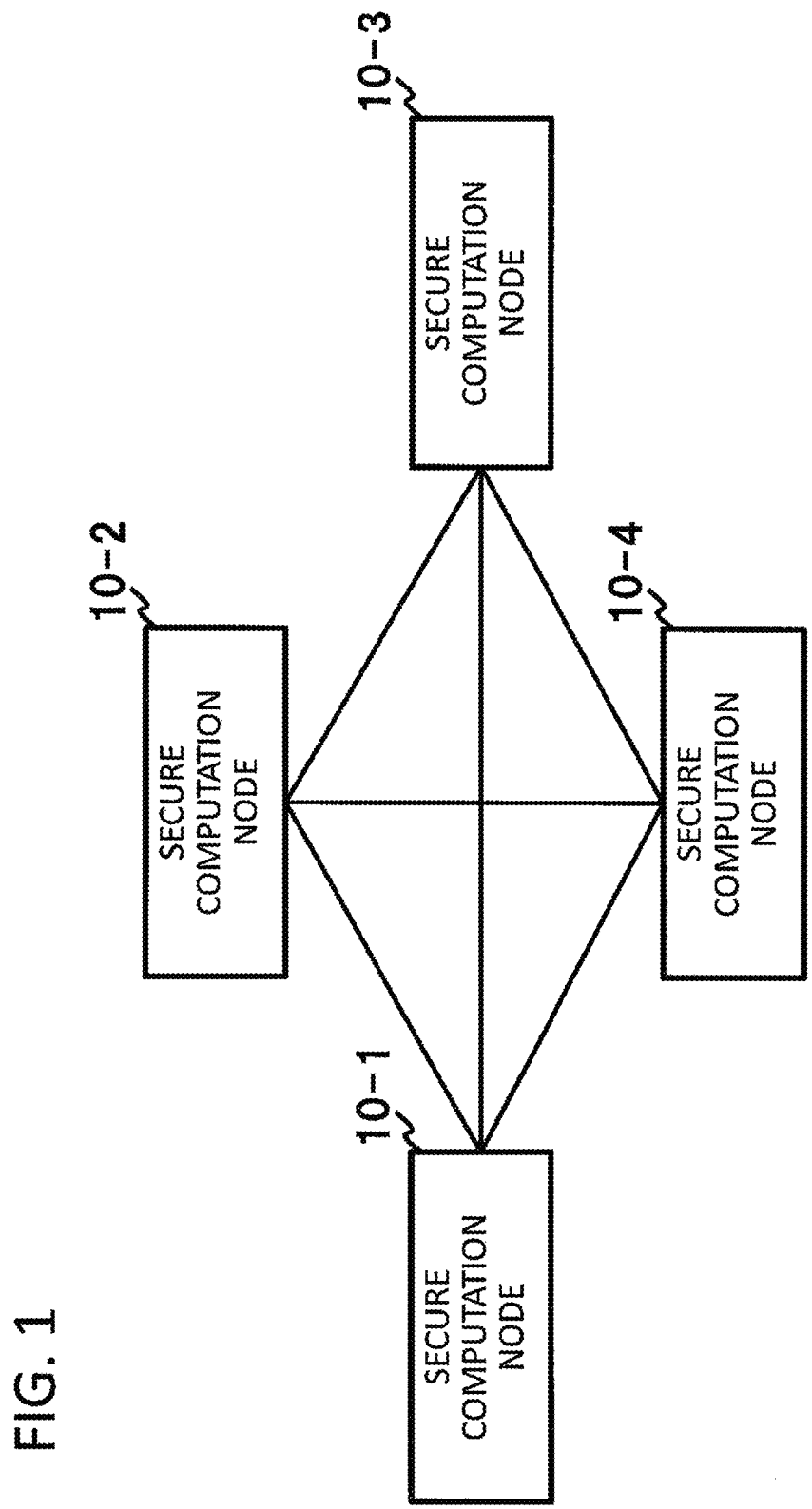
FIG. 1 is a diagram illustrating a configuration according to an example embodiment of the present invention.

First, an outline of an example embodiment of the present invention will be described with reference to drawings. In the following outline, various components are denoted by reference characters for the sake of convenience. That is, the following reference characters are merely used as examples to facilitate understanding of the present invention. Thus, the description of the outline is not meant to limit the present invention to the illustrated modes. An individual connection line between blocks in the drawings, etc. referred to in the following description signifies both one-way and two-way directions. An arrow schematically illustrates a principal signal (data) flow and does not exclude bidirectionality. A program is executed on a computer apparatus, and the computer apparatus includes, for example, a processor, a storage device, an input device, a communication interface, and as needed, a display device. In addition, this computer apparatus is configured such that the computer apparatus can communicate with its internal device or an external device (including a computer) via the communication interface in a wired or wireless manner. In addition, while a port or an interface is present at an input/output connection point of an individual block in the relevant drawings, illustration of the port or the interface is omitted. In addition, in the following description, "A and/or B" signifies A or B, or A and B.

As illustrated in FIG. 1, an example embodiment of the present invention can be realized by a shuffle system including four secure computation nodes 10-1 to 10-4 that holds data in a secret-shared form as first to third shares. The shares are shuffled by selecting, among these four secure computation nodes 10-1 to 10-4, first and second secure computation nodes as resharing nodes and third and fourth secure computation nodes as receiving nodes.

More concretely, the first and second secure computation nodes perform a mini-shuffle, respectively, for resharing share(s) they each hold by using a permutation(s) that the third and fourth receiving nodes do not know. The following description assumes that the secure computation nodes 10-1 and 10-2 in FIG. 2 are selected as the resharing nodes and the secure computation nodes 10-3 and 10-4 are selected as the receiving nodes.

Figure 2:
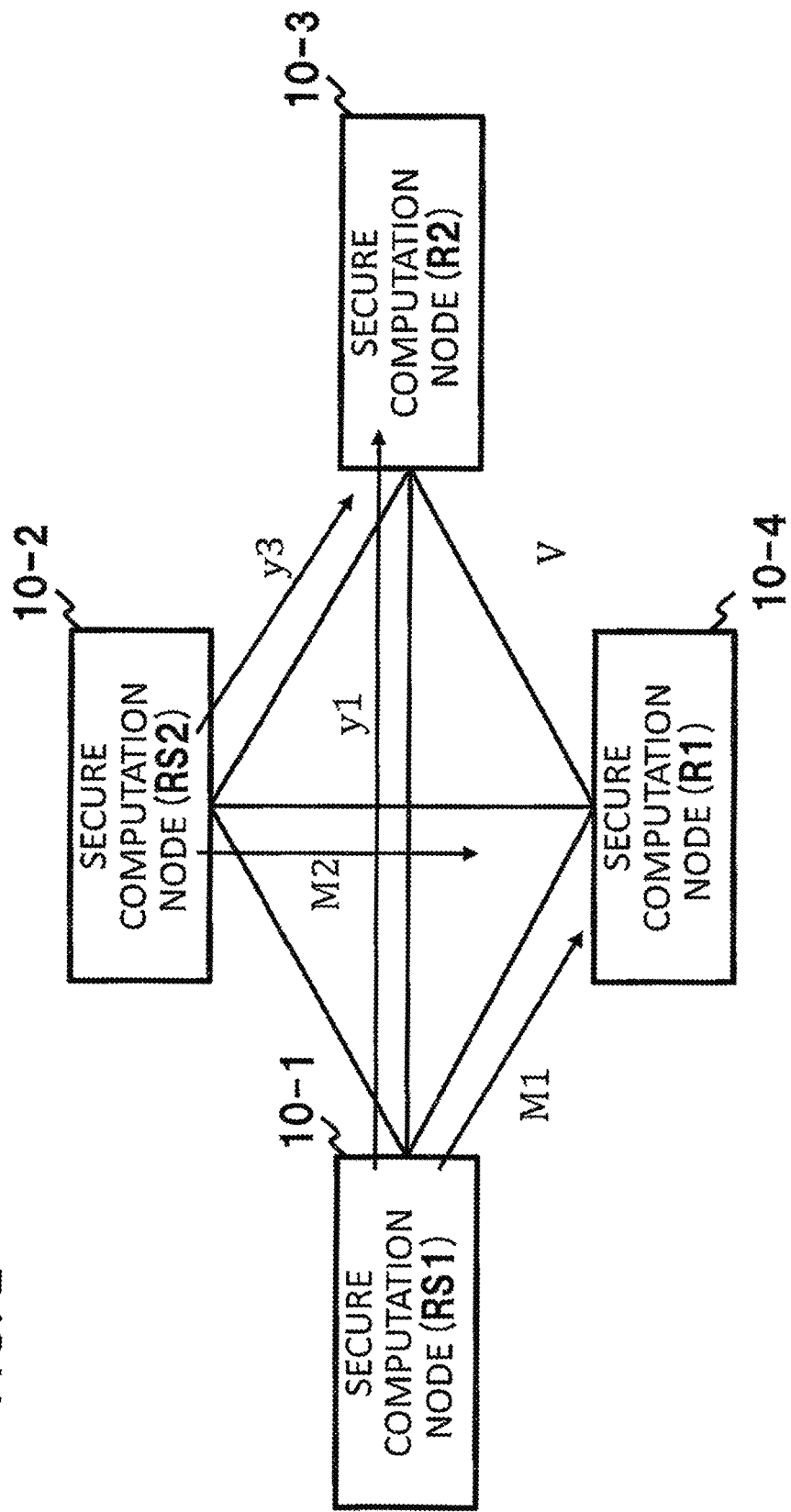
FIG. 2 is a diagram illustrating an operation according to the example embodiment of the present invention.

After the mini-shuffle, as illustrated in FIG. 2, the secure computation node 10-1 transmits a first share y1 to the secure computation node 10-3 and transmits a difference M1 between the first share and the second share to the secure computation node 10-4.

In contrast, the secure computation node 10-2 transmits a third share y3 to the secure computation node 10-3 and transmits a difference M2 between the second share and the third share to the secure computation node 10-4. The above processes are performed in the first round.

Figure 3:
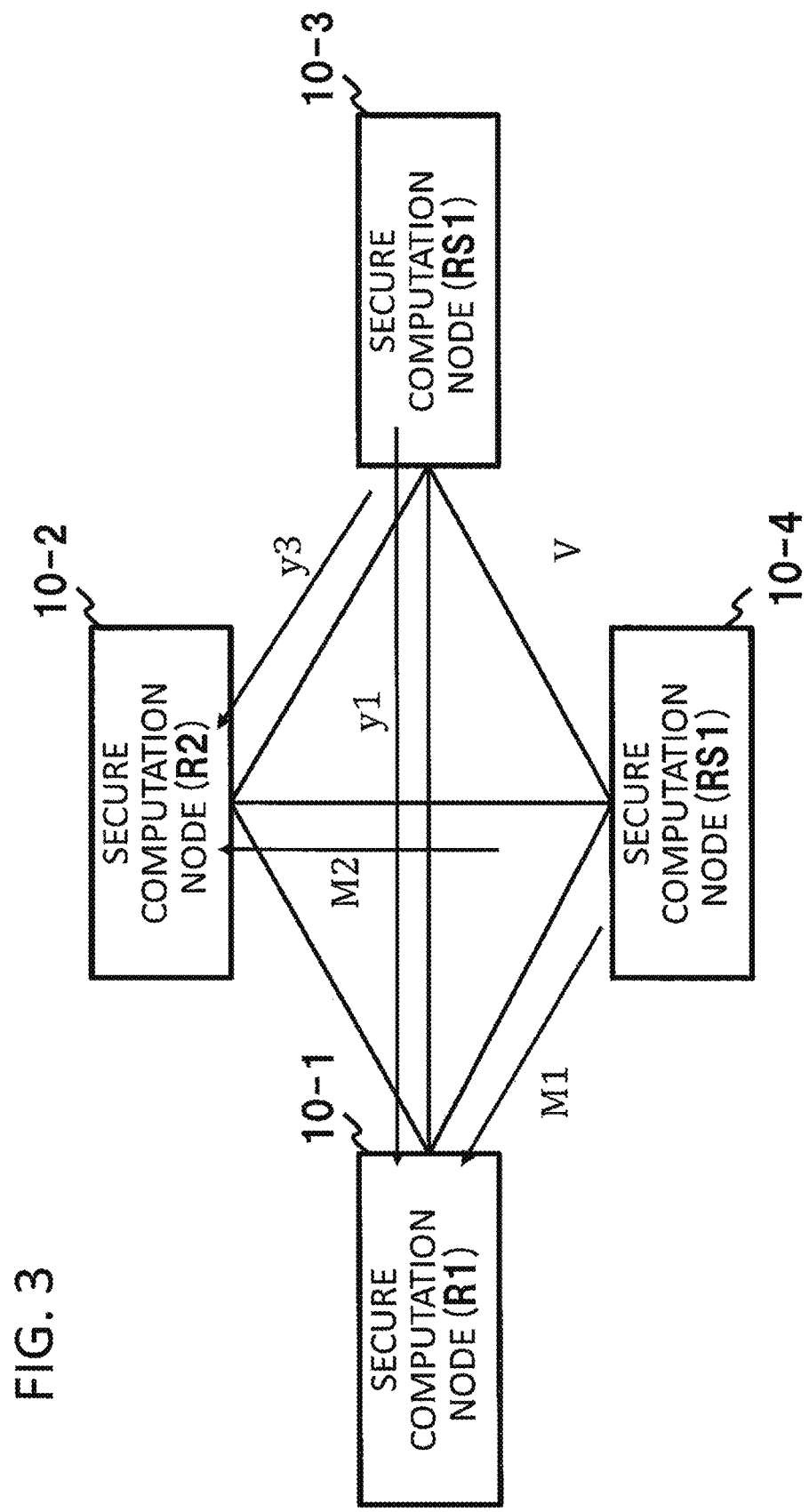
FIG. 3 is a diagram illustrating an operation according to the example embodiment of the present invention.

In the second round, the resharing nodes and the receiving nodes are switched. In FIG. 3, the secure computation nodes 10-3 and 10-4 are selected as the resharing nodes, and the secure computation nodes 10-1 and 10-2 is to be the receiving nodes.

As in the first round, the secure computation nodes 10-3 and 10-4 perform a mini-shuffle, respectively, for resharing share(s) they each hold by using a permutation(s) that the receiving nodes 10-1 and 10-2 do not know.

After performing the mini-shuffles, as illustrated in FIG. 3, the secure computation node 10-3 transmits the first share y1 to the secure computation node 10-1 and transmits the third share y3 to the secure computation node 10-2.

In contrast, the secure computation node 10-4 transmits the difference M1 between the first share and the second share to the secure computation node 10-1 and transmits the difference M2 between the second share and the third share to the secure computation node 10-2. The above processes are performed in the second round.

As described above, according to the present example embodiment, the shares can be shuffled by performing two times of round in which the number of permutations is two.

First Example Embodiment

Figure 4:
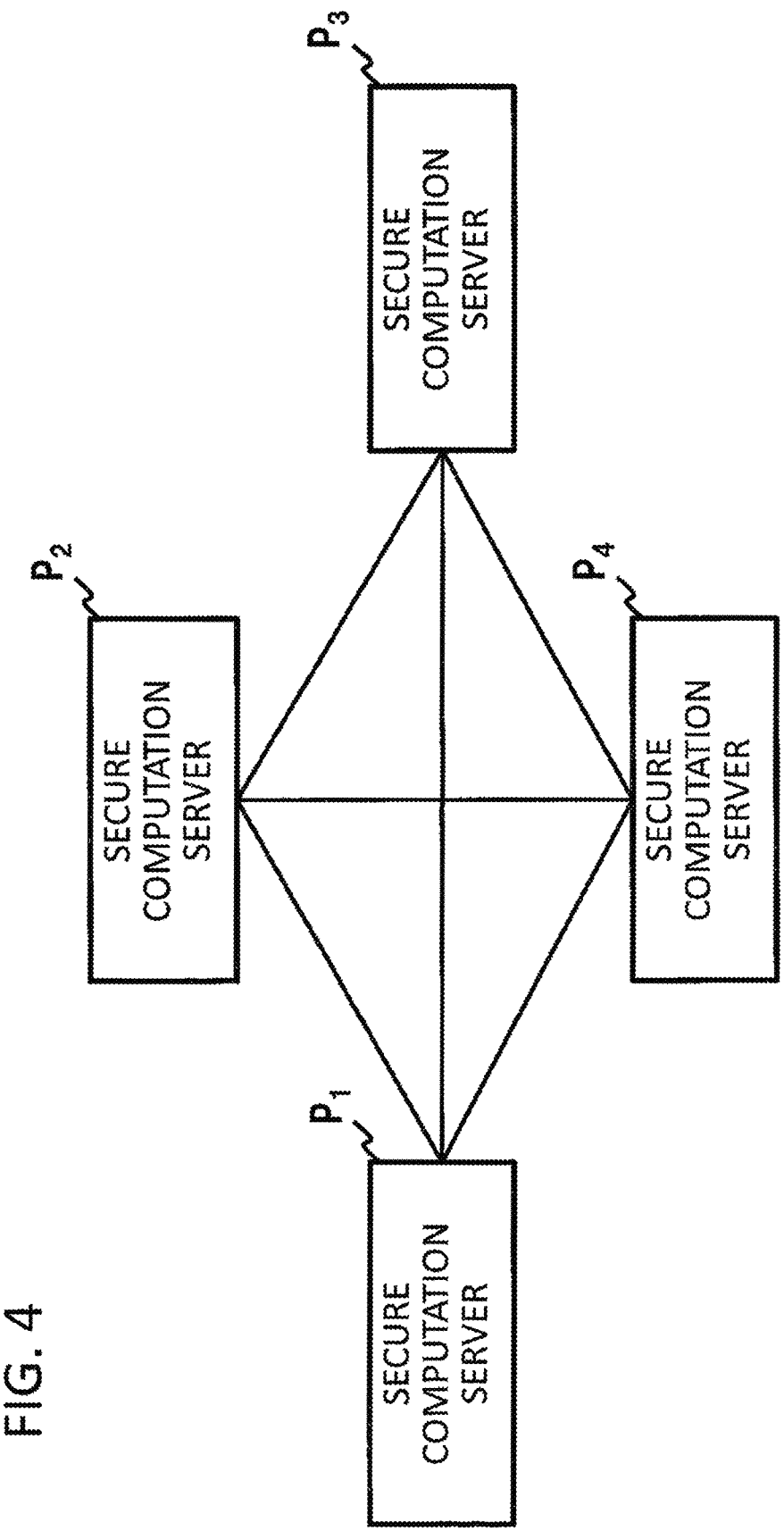
FIG. 4 is a diagram illustrating a configuration of a shuffle system according to a first example embodiment of the present invention.

Next, a first example embodiment of the present invention will be described in detail with reference to drawings. FIG. 4 is a diagram illustrating a configuration of a shuffle system according to the first example embodiment of the present invention. FIG. 4 illustrates a configuration in which four secure computation servers $P_1$ to $P_4$, which function as the secure computation nodes described above, are connected to each other. Unless a particular secure computation server is specified, any one of the secure computation servers will also be referred to as a secure computation server $P_i$.

Hereinafter, the notation used in the following description will be defined. The fourth line in the following [Math. 1] describes a finite ring, and the fifth line in the following

[Math. 1] describes a pseudorandom function. $S_m$ represents a set of permutations applied to m elements, and $\pi$ represents an arbitrary permutation belonging to $S_m$. Among the permutations. belonging to $S_m$, i.e. the set of permutations applied to m elements, $[\pi]_i$ represents a permutation that only $P_i$ and $P_{i+1}$ know.

The $i$-th party: $P_i(i=1,2,3,4)$

Security parameter: $\kappa$

The $i$-th seed: $seed_i \in \{0,1\}^\kappa$

A finite ring: $\mathbb{R}$ s.t.$|\mathbb{R}|$ is $k$-bits and its order is $R$.

A pseudorandom function: $H:\{0,1\}^* \times \{0,1\}^* \to \{0,1\}^k$

The vector of shares: $[\vec{x}]^m = ([x_1], \ldots, [x_m])$

All permutations of a set with $m$ elements: $S_m$

A permutation of a set with $m$ elements: $\pi \in S_m$

Only $P_i$ and $P_{i+1}$ know a permutation $\pi$: $[\pi]_i$ [Math. 1]

Hereinafter, the vector of an arbitrary element x will be expressed not only by an arrow over the element x but also by [vec{x}]. For example, an m dimensional vector of share x in the above [Math. 1] will also be expressed by $[vec\{x\}]^m$. In addition, $\{0,1\}^*$ represents a bit string of arbitrary length.

Figure 5:
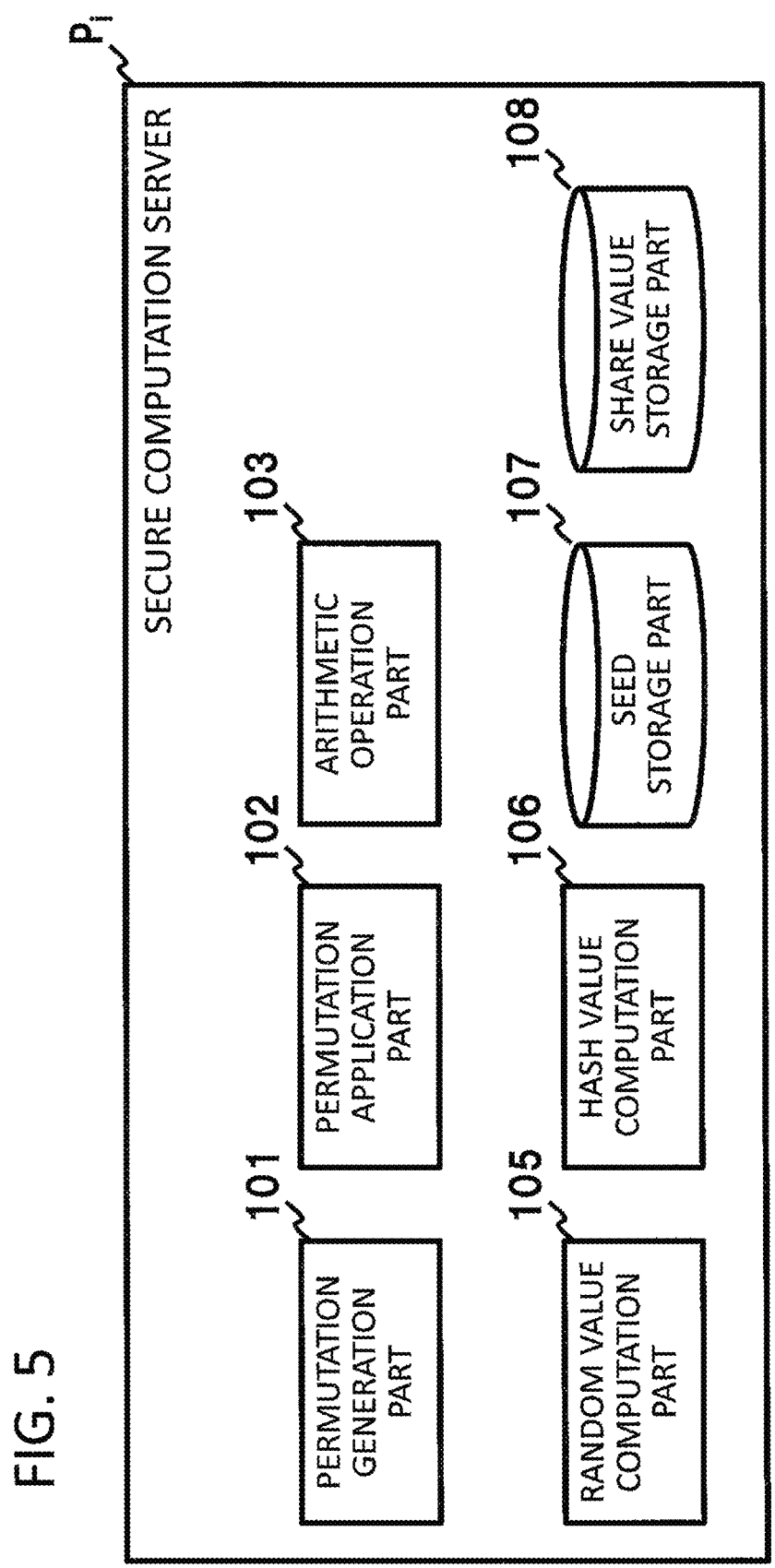
FIG. 5 is a diagram illustrating a configuration of a secure computation server according to the first example embodiment of the present invention.

FIG. 5 is a diagram illustrating a configuration of a secure computation server according to the first example embodiment of the present invention. FIG. 5 illustrates a configuration including a permutation generation part 101, a permutation application part 102, an arithmetic operation part 103, a random value computation part 105, a hash value computation part 106, a seed storage part 107, and a share value storage part 108.

The permutation generation part 101 generates a permutation(s) $[\pi]_i$ that only $P_i$ and $P_{i+1}$ know, in coordination with other secure computation server(s) $P_j$. For example, the secure computation server $P_1$ holds $[\pi]_1$ and $[\pi]_4$, but not information about $[\pi]_2$ and $[\pi]_3$.

The permutation application part 102 takes a m dimensional vector $[vec\{x\}]^m$ of the above share(s) x and the permutation(s) $[\pi]_i$ as input, and outputs $[vec\{y\}]^m$ obtained by permutating $[vec\{x\}]^m$. An example of concrete processes of the permutation application part 102 will be described below along with an operation according to the present example embodiment.

The arithmetic operation part 103 performs computation of the m dimensional vector $[vec\{x\}]^m$ of the share(s) of x and random values computed by the random value computation part 105, for example. An example of concrete processes of the arithmetic operation part 103 will be described below along with an operation according to the present example embodiment.

The random value computation part 105 generates two random values by using a seed(s) held in the seed storage part 107 and transmits the random values to the hash value computation part 106.

The hash value computation part 106 computes hash values of the random values computed by the random value computation part 105. According to the present example embodiment, these hash values are used as random values.

The seed storage part 107 stores the seeds used for generating random values as described above. The present example embodiment assumes that the seeds have previously been distributed to the secure computation servers $P_1$ to $P_4$ as follows.

$P_1:(seed_1, seed_2, seed_4)$ $P_2:(seed_2, seed_3, seed_4)$ $P_3:(seed_3, seed_1, seed_4)$ $P_4:(seed_1, seed_2, seed_3)$ The share value storage part 108 holds the m dimensional vector of share(s) as a permutation target(s). The following description will be made assuming that the individual secure computation servers $P_1$ to $P_4$ shared and hold shares of x, based on a 2-out-of-4 secret sharing scheme, as will be described below. Herein, x represents the elements of a finite ring R, and $x_1$, $x_2$, and $x_3$ are randomly generated such that $x_1+x_2+x_3$ satisfies x (mod R). Hereinafter, the share(s) of x will be denoted by [x], and the shares held by the secure computation server $P_i$ will be denoted by [x]i.

$P_1:[X]_1=(x_1,x_2)$ $P_2:[x]_2=(x_2,x_3)$ $P_3:[x]_3=(x_3,x_1)$ $P_4:[x]_4=(x_1-x_2, x_2-x_3)$

Next, an operation according to the present example embodiment will be described in detail with reference to drawings. According to the present example embodiment, a round performing a mini-shuffle, in which two of the secure computation servers $P_1$ to $P_4$ operate as resharing nodes and the other two secure computation servers operate as receiving nodes, is repeated at least two times, thereby, a shuffle of the shares of x, which are the m dimensional vector $[vec\{x\}]^m$, is performed.

Figure 6:
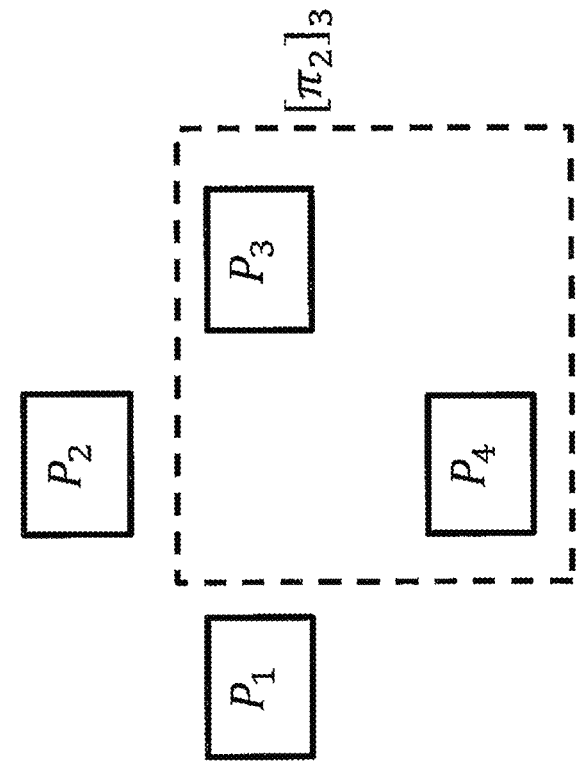
FIG. 6 is a diagram illustrating an example of a mini-shuffle execution order according to the first example embodiment of the present invention.
Figure 6:
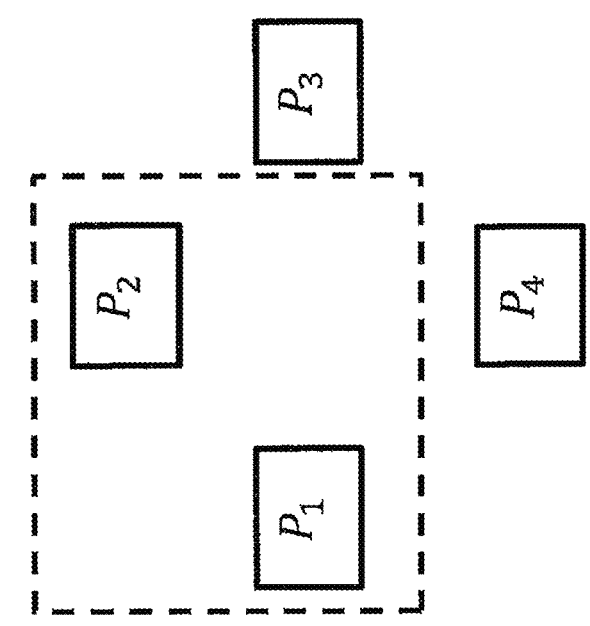

FIG. 6 is a diagram illustrating an example of a mini-shuffle execution order according to the first example embodiment of the present invention. As illustrated in FIG. 6, first, in case of i=1, $P_3$ and $P_4$, which are $P_{i+2}$ and $P_{i+3}$ operate as the receiving nodes. Then, $P_1$ and $P_2$, which are $P_i$ and $P_{i+1}$, perform a mini-shuffle with $[\pi_1]_1$ as the resharing nodes. Next, in a round of i=3, $P_1$ and $P_2$, which are $P_{i+2}$ and $P_{i+3}$, operate as the receiving nodes. Then, a mini-shuffle with $[\pi_2]_3$ is performed by causing $P_3$ and $P_4$, which are $P_i$ and $P_{i+1}$, perform a mini-shuffle with $[\pi_2]_3$ as the resharing nodes. A shuffle is completed by the above two rounds.

Next, details of the processes performed in the individual round will be described in order.

[Round 1 i=1]

Figure 7:
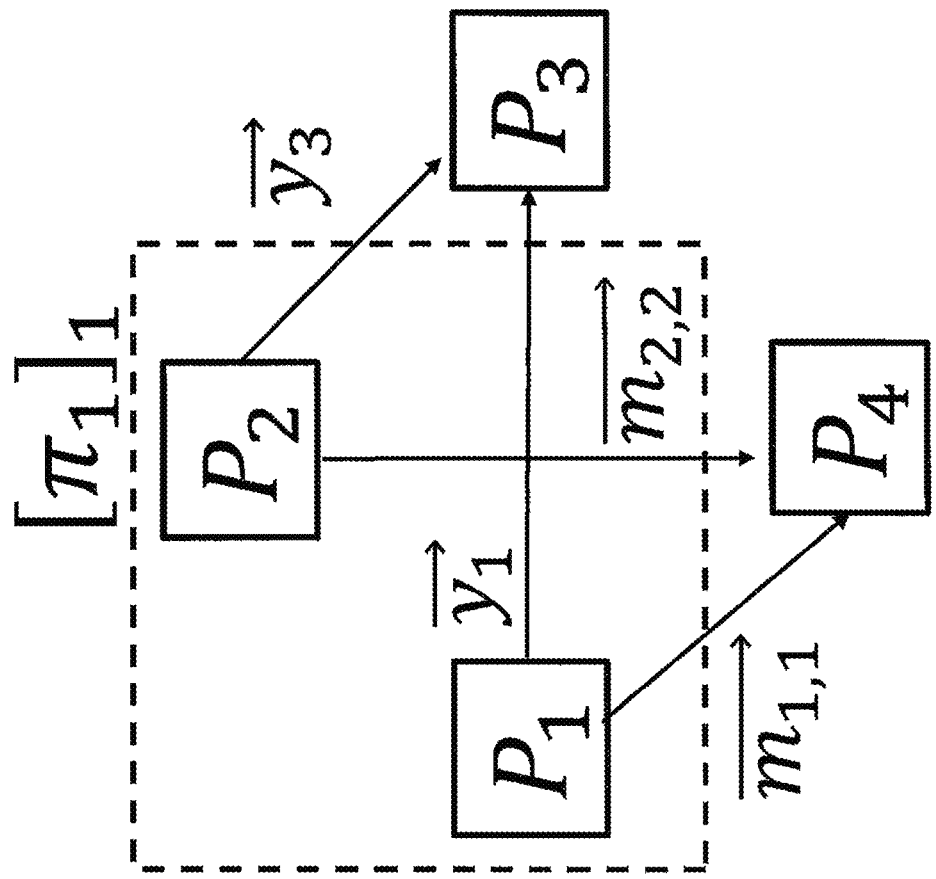
FIG. 7 is a diagram illustrating an operation in a round (i=1) according to the first example embodiment of the present invention.

FIG. 7 is a diagram illustrating an operation in a round (i=1). In round 1, the secure computation servers $P_3$ and $P_4$ operate as the receiving nodes. In addition, the secure computation servers $P_1$ and $P_2$ operate as the resharing nodes. The mini-shuffle in round 1 is expressed by the following expression [Math. 2].

$[\vec{y}]^m \leftarrow \text{MiniShuffle}(1,[\vec{x}]^m,[\pi_1]_1)$ [Math. 2]

$[vec\{x\}]^m$ on the right-hand side represents the m dimensional vector in which the share(s) x is (are) secret-shared and is expressed by $[x_1], \ldots, [x_m]$. In practice, as described above, $x_j$ is secret-shared in the secure computation server $P_i$ such that $x_j = x_{j,1} + x_{j,2} + x_{j,3}$ (j=1, \ldots, m) is satisfied. $[\pi]_1$ on the right-hand side is a permutation $[\pi]_1$ that only the secure computation servers $P_1$ and $P_2$ know.

An output $[\vec{y}]^m$ obtained from the above right-hand side content as the input is a result of a single mini-shuffle using the permutation $[\pi]_1$ and is expressed by $[y_{\pi_1(1)}], \ldots, [y_{\pi_1(m)}]$. $y_{\pi_1(j)}$ in this output is also shared and hold in the secure computation server $P_i$ such that $y_{\pi_1(j)} = y_{\pi_1(j),1} + y_{\pi_1(j),2} + y_{\pi_1(j),3}$ (j=1, ..., m) is satisfied, as described above.

The following expression [Math. 3] illustrates the above mini-shuffle procedure.

[Math. 3]

$P_1$ and $P_2$ generate the random values $r_{j,1}$ and $r_{j,2}$.

$r_{j,1} = H(vid_1 \| 1 \|_j, seed_2 \| seed_4)$ $r_{j,2} = H(vid_1 \| 2 \|_j, seed_2 \| seed_4)$    1.

Here, we set that $y_{\pi_1(j)} = y_{\pi_1(j),1} + y_{\pi_1(j),2} + y_{\pi_1(j),3} \pmod{R}$.    2.

$P_1$ computes $y_{\pi_1(j),1}$ and $y_{\pi_1(j),2}$.

$y_{\pi_1(j),1} = x_{\pi_1(j),1} - r_{j,1}$ $y_{\pi_1(j),2} = x_{\pi_1(j),2} - r_{j,1} - r_{j,2}$    3.

$P_2$ compute $y_{\pi_1(j),2}$ and $y_{\pi_1(j),3}$.

$y_{\pi_1(j),2} = x_{\pi_1(j),2} + r_{j,1} + r_{j,2}$ $y_{\pi_1(j),3} = x_{\pi_1(j),3} - r_{j,2}$    4.

$P_1$ sends $\vec{y_1}$ to $P_3$ and $P_2$ sends $\vec{y_3}$ to $P_3$.

$P_1$ sends $\vec{m_{1,1}} = \vec{y_1} - \vec{y_2}$ to $P_4$ and $P_2$ sends $\vec{m_{2,2}} = \vec{y_2} - \vec{y_3}$ to $P_4$.

$\vec{y_i} = (y_{\pi_1(1),i}, \ldots, y_{\pi_1(m),i})$    5.

(Step 1-1) First, the secure computation servers $P_1$ and $P_2$ generate two random values $r_{j,1}$ and $r_{j,2}$ by using previously distributed seeds, $seed_2$ and $seed_4$.

(Step 1-2 to 1-4) Next, the secure computation servers $P_1$ and $P_2$ compute $y_{\pi_1(j), 1}$, $y_{\pi_1(j), 2}$, and $y_{\pi_1(j), 3}$ such that $y_{\pi_1(j)} = y_{\pi_1(j), 1} + y_{\pi_1(j), 2} + y_{\pi_1(j), 3} \pmod{R}$ is satisfied by using the random values $r_{j,1}$ and $r_{j,2}$ in coordination with each other. Concretely, $y_{\pi_1(j), 1}$, $y_{\pi_1(j),2}$, and $y_{\pi_1(j),3}$ are computed as follows.

$y_{\pi_1(j),1} = x_{\pi_1(j),1} - r_{j,1}$ $y_{\pi_1(j),2} = x_{\pi_1(j),2} + r_{j,1} + r_{j,2}$ $y_{\pi_1(j),3} = x_{\pi_1(j),3} - r_{j,2}$ (Step 1-5) Next, the secure computation servers $P_1$ and $P_2$ transmit their computation results to the secure computation servers $P_3$ and $P_4$ operating as the receiving nodes (see FIG. 7). Concretely, the secure computation server $P_1$ transmits $\vec{y_1}$ to the secure computation server $P_3$. The secure computation server $P_2$ transmits $\vec{y_3}$ to the secure computation server $P_3$. In addition, the secure computation server $P_1$ transmits $\vec{y_1} - \vec{y_2}$ as $\vec{m_{1,1}}$ to the secure computation server $P_4$. In addition, the secure computation server $P_2$ transmits $\vec{y_2} - \vec{y_3}$ as $\vec{m_{2,2}}$ to the secure computation server $P_4$. As expressed by [Math. 3], $y_i$ is the m dimensional vector, for example, expressed by $([y_{\pi_1(1), i}], \ldots, [y_{\pi_1(m), i}])$.

As a result of the above mini-shuffle, the secure computation servers $P_1$ to $P_4$ hold a mini-shuffled m dimensional vector, as expressed by the following expression [Math. 4].

[Math. 4]

$$P_1: (\vec{y_1}, \vec{y_2}) = ((y_{\pi_1(1),1}, y_{\pi_1(1),2}), \ldots, (y_{\pi_1(m),1}, y_{\pi_1(m),2})) = ([y_{\pi_1(1)}]_1, \ldots, [y_{\pi_1(m)}]_1)$$

$$P_2: (\vec{y_2}, \vec{y_3}) = ((y_{\pi_1(1),2}, y_{\pi_1(1),3}), \ldots, (y_{\pi_1(m),2}, y_{\pi_1(m),3})) = ([y_{\pi_1(1)}]_2, \ldots, [y_{\pi_1(m)}]_2)$$

$$P_3: (\vec{y_3}, \vec{y_1}) = ((y_{\pi_1(1),3}, y_{\pi_1(1),1}), \ldots, (y_{\pi_1(m),3}, y_{\pi_1(m),1})) = ([y_{\pi_1(1)}]_3, \ldots, [y_{\pi_1(m)}]_3)$$

$$P_4: (\vec{m_{1,1}}, \vec{m_{2,2}}) = (\vec{y_1} - \vec{y_2}, \vec{y_2} - \vec{y_3})$$

$$= ((y_{\pi_1(1),1} - y_{\pi_1(1),2}, y_{\pi_1(1),2} - y_{\pi_1(1),3}), \ldots, (y_{\pi_1(m),1} - y_{\pi_1(m),2}, y_{\pi_1(m),2} - y_{\pi_1(m),3}))$$

$$= ([y_{\pi_1(1)}]_4, \ldots, [y_{\pi_1(m)}]_4)$$

[Round 2 i=2]

Figure 8:
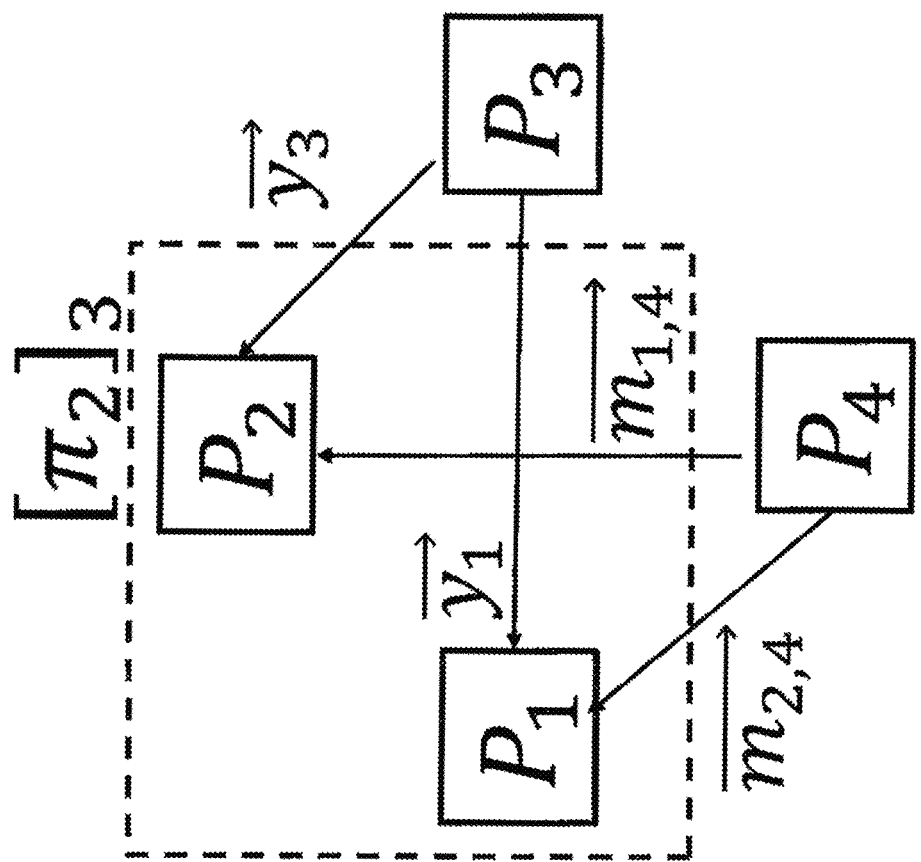
FIG. 8 is a diagram illustrating an operation in a round (i=2) according to the first example embodiment of the present invention.

FIG. 8 is a diagram illustrating an operation in a round (i=2). In round 2, the secure computation servers $P_1$ and $P_2$ operate as the receiving nodes. In addition, the secure computation servers $P_3$ and $P_4$ operate as the resharing nodes. The mini-shuffle in round 2 is expressed by the following expression [Math. 5].

$[\vec{y}]^m \leftarrow \text{MiniShuffle}(2, [\vec{x}]^m, [\pi_2]_3)$    [Math. 5]

$[\pi]_3$ on the right-hand side is a permutation $[\pi]_1$ that only the secure computation servers $P_3$ and $P_4$ know.

An output $[\vec{y}]^m$ obtained from the above right-hand side content as the input is a result of a single mini-shuffle using the permutation $[\pi]_3$ and is expressed by $[y_{\pi_2(1)}], \ldots, [y_{\pi_2(m)}]$. $y_{\pi_2(j)}$ in this output is also secret-shared in the secure computation server $P_i$ such that $y_{\pi_2(j)} = y_{\pi_2(j), 1} + y_{\pi_2(j),2} + y_{\pi_2(j), 3}$ (j=1, ..., m) is satisfied, as described above.

The following expression [Math. 6] illustrates the above mini-shuffle procedure.

[Math. 6]

$P_3$ and $P_4$ generate the random values $r_{j,1}$ and $r_{j,2}$.

$r_{j,1} = H(vid_1 \| 1 \|_j, seed_2 \| seed_3)$ $r_{j,2} = H(vid_1 \| 2 \|_j, seed_2 \| seed_3)$    1.

Here, we set that $y_{\pi_2(j)} = y_{\pi_2(j),1} + y_{\pi_1(j),2} + y_{\pi_2(j),3} \pmod{R}$.

$y_{\pi_2(j),1} = x_{\pi_2(j),1} - r_{j,1}$ $y_{\pi_2(j),2} = x_{\pi_2(j),2} - r_{j,1} + r_{j,2}$ $y_{\pi_2(j),3} = x_{\pi_2(j),3} - r_{j,2}$    2.

$P_3$ computes $y_{\pi_2(j),1}$ and $y_{\pi_2(j),3}$.    3.

$P_4$ compute $y_{\pi_2(j),1} - y_{\pi_2(j),2}$ and $y_{\pi_2(j),2} - y_{\pi_2(j),3}$ as follows:

$$y_{\pi_4(j),1} - y_{\pi_4(j),2} = (x_{\pi_4(j),1} - x_{\pi_4(j),2}) - 2r_{j,1} - r_{j,2}$$

$$y_{\pi_4(j),2} - y_{\pi_4(j),3} = (x_{\pi_4(j),2} - x_{\pi_4(j),3}) + r_{j,1} + 2r_{j,2} \qquad 4.$$

$P_3$ sends $\vec{y_1}$ to $P_1$ and $\vec{y_3}$ to $P_2$.

$P_4$ sends $\vec{m_{2,4}} = \vec{y_1} - \vec{y_2}$ to $P_1$ and $\vec{m_{1,4}} = \vec{y_2} - \vec{y_3}$ to $P_2$.

$$\vec{y_1} = (y_{\pi_1(1),i}, \ldots, y_{\pi_1(m),i}) \qquad 5.$$

(Step 2-1) First, the secure computation servers $P_3$ and $P_4$ generate two random values $r_{j,1}$ and $r_{j,2}$ by using previously distributed seeds, $seed_1$ and $seed_3$.

(Steps 2-2 to 2-4) Next, the secure computation servers $P_3$ and $P_4$ compute $y_{\pi_2(j),1}$, $y_{\pi_2(j),2}$, and $y_{\pi_2(j),3}$ such that $y_{\pi_2(j)} = y_{\pi_2(j),1} + y_{\pi_2(j),2} + y_{\pi_2(j),3} \pmod{R}$ is satisfied by using the random values $r_{j,1}$ and $r_{j,2}$ in coordination with each other. Concretely, the secure computation servers $P_3$ and $P_4$ compute $y_{\pi_2(j),1}$, $y_{\pi_2(j),2}$, and $y_{\pi_2(j),3}$ as follows.

$$y_{\pi_2(j),1} = x_{\pi_2(j),1} - r_{j,1}$$

$$y_{\pi_2(j),1} = x_{\pi_2(j),1} + r_{j,1} + r_{j,2}$$

$$y_{\pi_2(j),3} = x_{\pi_2(j),3} - r_{j,2}$$

In addition, the secure computation server $P_4$ computes $y_{\pi_2(j),1} - y_{\pi_2(j),2}$ and $y_{\pi_2(j),2} - y_{\pi_2(j),3}$ as expressed by [Math. 6].

(Step 2-5) Next, the secure computation servers $P_3$ and $P_4$ transmit their computation results to the secure computation servers $P_1$ and $P_2$ operating as the receiving nodes (see FIG. 8). Concretely, the secure computation server $P_3$ transmits vec$\{y_1\}$ to the secure computation server $P_1$ and transmits vec$\{y_3\}$ to the secure computation server $P_2$. In addition, the secure computation server $P_4$ transmits vec$\{y_1\}$-vec$\{y_2\}$ as vec$\{m_{2,4}\}$ to the secure computation server $P_1$. In addition, the secure computation server $P_4$ transmits vec$\{y_2\}$-vec$\{y_3\}$ as vec$\{m_{1,4}\}$ to the secure computation server $P_2$. As expressed by [Math. 6], $y_i$ is the m dimensional vector, for example, expressed by $([y_{\pi_2(1),i}], \ldots, [y_{\pi_2(m),i}])$.

As a result of the above mini-shuffle, the secure computation servers $P_1$ to $P_4$ hold a mini-shuffled m dimensional vector, as expressed by the following expression [Math. 7].

By performing the above mini-shuffles, it is possible to perform permutations $[\pi]_1$, $[\pi]_3$ each once to the inputted [vec$\{x\}]^m$, and a shuffle in a manner that none of the secure computation servers $P_i$ can determine the input-output correspondence relationship.

The permutations in the above 2 rounds can be expressed by the following [Math. 8].

[Math. 8]

$$[\vec{y}]^m \leftarrow \text{MiniShuffle1}([\vec{x}]^m, [\pi_1]_1) \qquad 1.$$

$$[\vec{z}]^m \leftarrow \text{MiniShuffle2}([\vec{y}]^m, [\pi_2]_3) \qquad 2.$$

Furthermore, since a communication of m elements with a security parameter κ bits is performed four times per round, the shuffle cost according to the present example embodiment is 8κm bits in the total for two rounds.

While example embodiments of the present invention have thus been described, the present invention is not limited thereto. Further variations, substitutions, or adjustments can be made without departing from the basic technical concept of the present invention. For example, the connection configurations between devices or apparatuses, the configurations of the elements, and the representation modes of the data illustrated in the drawings have been used only as examples to facilitate understanding of the present invention. That is, the present invention is not limited to the configurations illustrated in the drawings.

For example, an incorrectness or fraud detection function is omitted in the above first example embodiment. However, the incorrectness or fraud detection function can be added by adding any one of various Equality Test Protocols, for example.

Figure 9:
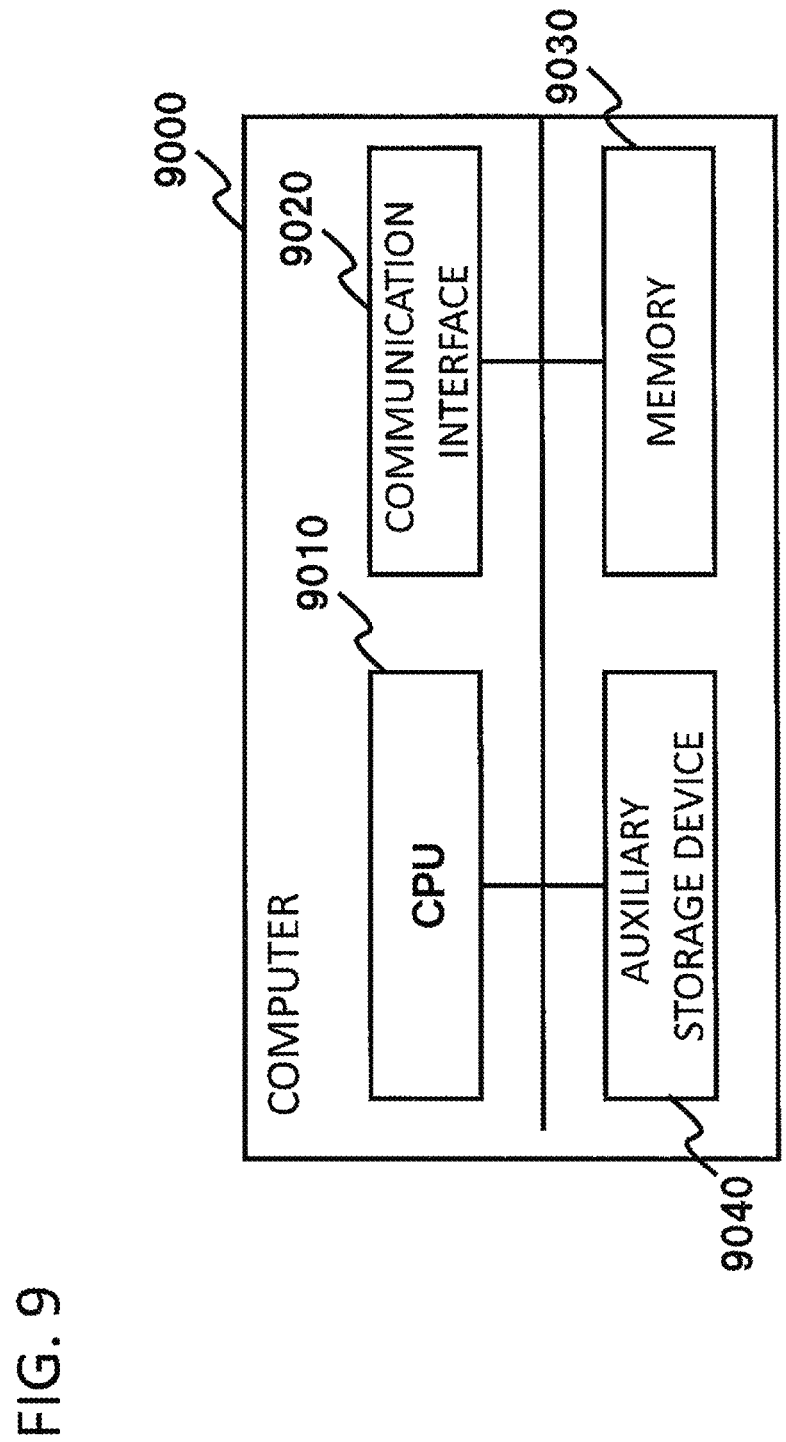
FIG. 9 is a diagram illustrating a configuration of a computer that configures a secure computation server according to the present invention.

Each of the procedures described in the above example embodiments can be realized by a program that causes a computer (9000 in FIG. 9) which functions as a corresponding one of the secure computation nodes and the secure computation servers Pi to realize the function as the corresponding apparatus. This computer includes, for example, a CPU (Central Processing Unit) 9010, a communication interface 9020, a memory 9030, and an auxiliary storage device 9040 in FIG. 9. That is, the CPU 9010 in FIG. 9 performs the random number generation program and the permutation processing program and performs updating process of each calculation parameters stored in the auxiliary storage device 9040, etc.

That is, the individual parts (processing means, functions) of the secure computation servers $P_i$ according to the above example embodiments can each be realized by a computer program that causes a processor mounted on the corresponding apparatus to use corresponding hardware and execute each process as described above.

[Math. 7]

$$P_1: \left(\vec{y_1}, -\vec{m_{2,4}} + \vec{y_1}\right) = \left((y_{\pi_2(1),1}, y_{\pi_2(1),2}), \ldots, (y_{\pi_2(m),1}, y_{\pi_2(m),2})\right) = \left([y_{\pi_2(1)}]_1, \ldots, [y_{\pi_2(m)}]_1\right)$$

$$P_2: \left(\vec{m_{1,4}} + \vec{y_3}, \vec{y_3}\right) = \left((y_{\pi_2(1),2}, y_{\pi_2(1),3}), \ldots, (y_{\pi_2(m),2}, y_{\pi_2(m),3})\right) = \left([y_{\pi_2(1)}]_2, \ldots, [y_{\pi_2(m)}]_2\right)$$

$$P_3: \left(\vec{y_3}, \vec{y_1}\right) = \left((y_{\pi_2(1),3}, y_{\pi_2(1),1}), \ldots, (y_{\pi_2(m),3}, y_{\pi_2(m),1})\right) = \left([y_{\pi_2(1)}]_3, \ldots, [y_{\pi_2(m)}]_3\right)$$

$$P_4: \left(\vec{y_1} - \vec{y_2}, \vec{y_2} - \vec{y_3}\right)$$

$$= \left((y_{\pi_2(1),1} - y_{\pi_2(1),2}, y_{\pi_3(1),2} - y_{\pi_2(1),3}), \ldots, (y_{\pi_2(m),1} - y_{\pi_3(m),2}, y_{\pi_2(m),2} - y_{\pi_2(m),3})\right)$$

$$= \left([y_{\pi_2(1)}]_4, \ldots, [y_{\pi_2(m)}]_4\right)$$

Finally, preferred modes of the present invention will be summarized.

Mode 1

(See the shuffle system according to the above first aspect)

Mode 2

In the shuffle system, wherein the four secure computation nodes may include:
a first secure computation node that holds two seeds ($seed_2$ and $seed_4$) and shares ($x_1$ and $x_2$) of secret information x in a secret-shared form;
a second secure computation node that holds two seeds ($seed_2$ and $seed_4$) and shares ($x_2$ and $x_3$) of the secret information x in a secret-shared form;
a third secure computation node that holds two seeds ($seed_1$ and $seed_3$) and shares ($x_3$ and $x_1$) of the secret information x in a secret-shared form; and
a fourth secure computation node that holds two seeds ($seed_1$ and $seed_3$) and shares ($x_1-x_2$ and $x_2-x_3$) of the secret information x in a secret-shared form;
wherein the resharing nodes may generate two random values by using the corresponding seeds; and
wherein the resharing nodes transmit a result, which is obtained by applying a combination of the random values to the share(s) held therein, as a result of the mini-shuffle, to the receiving nodes.

Mode 3

(See the shuffle method according to the above second aspect)

Mode 4

(See the program according to the above third aspect)

The above modes 3 and 4 can be expanded in the same way as mode 1 is expanded to mode 2.

The disclosure of each of the above PTLs and NPLs is incorporated herein by reference thereto and may be used as the basis or a part of the present invention, as needed. Modifications and adjustments of the example embodiments and examples are possible within the scope of the overall disclosure (including the claims) of the present invention and based on the basic technical concept of the present invention. Various combinations or selections (including partial deletion) of various disclosed elements (including the elements in each of the claims, example embodiments, examples, drawings, etc.) are possible within the scope of the disclosure of the present invention. That is, the present invention of course includes various variations and modifications that could be made by those skilled in the art according to the overall disclosure including the claims and the technical concept. The description discloses numerical value ranges. However, even if the description does not particularly disclose arbitrary numerical values or small ranges included in the ranges, these values and ranges should be deemed to have been specifically disclosed. In addition, as needed and based on the gist of the present invention, partial or entire use of the individual disclosed matters in the above literatures that have been referred to in combination with what is disclosed in the present application should be deemed to be included in what is disclosed in the present application, as a part of the disclosure of the present invention.

INDUSTRIAL APPLICABILITY

The present invention is applicable not only to a shuffle system but also to a secret-sharing system in which sorting process using a shuffle function of a shuffle system is performed.

REFERENCE SIGNS LIST 10-1 to 10-4 secure computation node
101 permutation generation part
102 permutation application part
103 arithmetic operation part
105 random value computation part
106 hash value computation part
107 seed storage part
108 share value storage part
9000 computer
9010 CPU
9020 communication interface
9030 memory
9040 auxiliary storage device
$P_1$ to $P_4$ secure computation server

What is claimed is:

1. A shuffle system for shuffling shares, wherein the shuffle system comprises four secret computation nodes networked to each other, and wherein each of the four secret computation nodes comprises at least one memory storing instructions and at least one processor configured to execute the instructions to:
shuffle shares of data held by the four secure computation nodes in a secret-shared form by performing a first round and a second round, the shares of data including first, second, third, and fourth shares of secret information;
in the first round,
select, from among the four secure computation nodes holding the first, second, and third shares, first and second secure computation nodes as resharing nodes and third and fourth secure computation nodes as receiving nodes;
perform, by the first and second secure computation nodes, a mini-shuffle for resharing the shares held by the first and second secure computation nodes, by using a permutation unknown by the third and fourth secure computation nodes;
transmit, by the first secure computation node, the first share to the third secure computation node;
transmit, by the first secure computation node, a difference between the first share and the second share to the fourth secure computation node;
transmit, by the second secure computation node, the third share to the third secure computation node; and
transmit, by the second secure computation node, difference between the second share and the third share to the fourth secure computation node, and
in the second round,
select the third and fourth secure computation nodes as the resharing nodes and the first and second secure computation nodes as the receiving nodes;
perform, by the third and fourth secure computation nodes, the mini-shuffle for resharing the shares held by the third and fourth secure computation nodes, by using a permutation unknown by the first and second secure computation nodes;
transmit, by the third secure computation node, the first share to the first secure computation node;

transmit, by the fourth secure computation node, a difference between the first share and the second share to the first secure computation node;

transmit, by the third secure computation node, the third share to the second secure computation node; and transmit, by the fourth secure computation node, a difference between the second share and the third share to the second secure computation node.

2. The shuffle system according to claim 1, wherein the first secure computation node holds first, second, and fourth seeds and the first and second shares of the secret information in the secret-shared form, the second secure computation node holds the second and fourth seeds and a third seeds and the second and third shares of the secret information in the secret-shared form, the third secure computation node holds the third, first, and fourth seeds and the third and first shares of the secret information in the secret-shared form, the fourth secure computation node holds the first, second, and third seeds, a difference between the first and second shares in the secret-shared form, and a difference between the second and third shares in the secret-shared form, the resharing nodes each generate two random values by using seeds held thereby, and the resharing nodes each transmit to the receiving nodes a result obtained by applying a combination of the generated two random values to the shares held thereby, as a result of the mini-shuffle.

3. A shuffle method performed by a shuffle system comprising four secure computation nodes, the shuffle method comprising:

shuffling shares of data held by the four secure computation nodes in a secret-shared form by performing a first round and a second round, the shares of data including first, second, third, and fourth shares of secret information;

in the first round, selecting, from among the four secure computation nodes holding the first, second, and third shares, first and second secure computation nodes as resharing nodes and third and fourth secure computation nodes as receiving nodes;

performing, by the first and second secure computation nodes, a mini-shuffle for resharing the shares held by the first and second secure computation nodes, by using a permutation unknown by the third and fourth secure computation nodes;

transmitting, by the first secure computation node, the first share to the third secure computation node;

transmitting, by the first secure computation node, a difference between the first share and the second share to the fourth secure computation node;

transmitting, by the second secure computation node, the third share to the third secure computation node; and transmitting, by the second secure computation node, difference between the second share and the third share to the fourth secure computation node, and in the second round, selecting the third and fourth secure computation nodes as the resharing nodes and the first and second secure computation nodes as the receiving nodes;

performing, by the third and fourth secure computation nodes, the mini-shuffle for resharing the shares held by the third and fourth secure computation nodes, by using a permutation unknown by the first and second secure computation nodes;

transmitting, by the third secure computation node, the first share to the first secure computation node;

transmitting, by the fourth secure computation node, a difference between the first share and the second share to the first secure computation node;

transmitting, by the third secure computation node, the third share to the second secure computation node; and transmitting, by the fourth secure computation node, a difference between the second share and the third share to the second secure computation node.

4. The shuffle method according to claim 3, wherein the first secure computation node holds first, second, and fourth seeds and the first and second shares of the secret information in the secret-shared form, the second secure computation node holds the second and fourth seeds and a third seeds and the second and third shares of the secret information in the secret-shared form, the third secure computation node holds the third, first, and fourth seeds and the third and first shares of the secret information in the secret-shared form, the fourth secure computation node holds the first, second, and third seeds, a difference between the first and second shares in the secret-shared form, and a difference between the second and third shares in the secret-shared form, the resharing nodes each generate two random values by using seeds held thereby, and the resharing nodes each transmit to the receiving nodes a result obtained by applying a combination of the generated two random values to the shares held thereby, as a result of the mini-shuffle.

5. A non-transitory computer-readable medium storing a program executable by a first secure computation node of a shuffle system to perform processing, wherein the shuffle system comprises four secure computation nodes holding shares of data in a secret-shared form, the shares of data include first, second, third, and fourth shares of secret information, the four secure computation nodes include the first secure computation node, a second computation node, a third computation node, and a fourth computation node, the processing is performed in first and second rounds for shuffling the shares of data, in the first round, the first and second computation nodes operate as resharing nodes and the third and fourth computation nodes operate as receiving nodes, in the second round, the first and second computation nodes operate as the receiving nodes and the third and fourth computation nodes operate as the sharing nodes, the processing comprises, in the first round:

performing a mini-shuffle for resharing the shares held by the first secure computation node, by using a permutation unknown by the third and fourth secure computation nodes;

transmitting the first share to the third secure computation node; and transmitting a difference between the first share and the second share to the fourth secure computation node, and the processing comprises, in the second round:

receiving the first share from the third secure computation node; and receiving a difference between the first share and the second share from the fourth secure computation node.

6. The non-transitory computer-readable medium according to claim 5, wherein
the first secure computation node holds first, second, and fourth seeds and the first and second shares of the secret information in the secret-shared form,
the second secure computation node holds the second and fourth seeds and a third seeds and the second and third shares of the secret information in the secret-shared form,
the third secure computation node holds the third, first, and fourth seeds and the third and first shares of the secret information in the secret-shared form,
the fourth secure computation node holds the first, second, and third seeds, a difference between the first and second shares in the secret-shared form, and a difference between the second and third shares in the secret-shared form,
the resharing nodes each generate two random values by using seeds held thereby, and
the resharing nodes each transmit to the receiving nodes a result obtained by applying a combination of the generated two random values to the shares held thereby, as a result of the mini-shuffle.

7. A non-transitory computer-readable medium storing a program executable by a second secure computation node of a shuffle system to perform processing, wherein
the shuffle system comprises four secure computation nodes holding shares of data in a secret-shared form,
the shares of data include first, second, third, and fourth shares of secret information,
the four secure computation nodes include the second secure computation node, a first computation node, a third computation node, and a fourth computation node,
the processing is performed in first and second rounds for shuffling the shares of data,
in the first round, the first and second computation nodes operate as resharing nodes and the third and fourth computation nodes operate as receiving nodes,
in the second round, the first and second computation nodes operate as the receiving nodes and the third and fourth computation nodes operate as the sharing nodes,
the processing comprises, in the first round:
performing a mini-shuffle for resharing the shares held by the second secure computation node, by using a permutation unknown by the third and secure computation nodes;
transmitting the third share to the third secure computation node; and
transmitting a difference between the second share and the third share to the fourth secure computation node, and
the processing comprises, in the second round:
receiving the third share from the third secure computation node; and
receiving a difference between the second share and the third share from the fourth secure computation node.

8. The non-transitory computer-readable medium according to claim 7, wherein
the first secure computation node holds first, second, and fourth seeds and the first and second shares of the secret information in the secret-shared form,
the second secure computation node holds the second and fourth seeds and a third seeds and the second and third shares of the secret information in the secret-shared form,
the third secure computation node holds the third, first, and fourth seeds and the third and first shares of the secret information in the secret-shared form,
the fourth secure computation node holds the first, second, and third seeds, a difference between the first and second shares in the secret-shared form, and a difference between the second and third shares in the secret-shared form,
the resharing nodes each generate two random values by using seeds held thereby, and
the resharing nodes each transmit to the receiving nodes a result obtained by applying a combination of the generated two random values to the shares held thereby, as a result of the mini-shuffle.

* * * * *